(12) United States Patent
Kobayashi

(10) Patent No.: US 10,903,001 B2
(45) Date of Patent: Jan. 26, 2021

(54) METHOD AND APPARATUS FOR PRODUCING RADIALLY ALIGNED MAGNETORHEOLOGICAL ELASTOMER MOLDED BODY

(71) Applicant: Fuji Polymer Industries Co., Ltd., Nagoya (JP)

(72) Inventor: Shingo Kobayashi, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 232 days.

(21) Appl. No.: 16/006,390

(22) Filed: Jun. 12, 2018

(65) Prior Publication Data
US 2019/0006099 A1 Jan. 3, 2019

(30) Foreign Application Priority Data
Jul. 3, 2017 (JP) .................................. 2017-130558

(51) Int. Cl.
*H01F 41/02* (2006.01)
*B29C 70/62* (2006.01)
(Continued)

(52) U.S. Cl.
CPC ..... *H01F 41/0266* (2013.01); *B29C 45/0001* (2013.01); *B29C 45/0013* (2013.01);
(Continued)

(58) Field of Classification Search
None
See application file for complete search history.

(56) References Cited

U.S. PATENT DOCUMENTS

| 5,181,971 | A | * | 1/1993 | Ohtsuka | B82Y 15/00 148/103 |
| 5,672,363 | A | * | 9/1997 | Sagawa | B22F 3/003 264/313 |

(Continued)

FOREIGN PATENT DOCUMENTS

| CN | 103854822 | 3/2017 |
| JP | 56-069805 | 6/1981 |

(Continued)

OTHER PUBLICATIONS

Espacenet machine translation of JPS62186508 (obtained Mar. 20, 2020).*
(Continued)

*Primary Examiner* — Matthew J Daniels
*Assistant Examiner* — Paul Spiel
(74) *Attorney, Agent, or Firm* — Hamre, Schumann, Mueller & Larson, P.C.

(57) ABSTRACT

A method and an apparatus for producing a radially aligned magnetorheological elastomer molded body containing a matrix resin and a magnetic filler are provided. The method includes the following: placing a permanent magnet 11 in at least one position selected from positions that are spaced from a metal mold 14a having a cavity 14b and located above and below the center of the metal mold 14a; providing a closed magnetic circuit that allows a magnetic flux 19a generated by the permanent magnet 11 to pass through the metal mold 14a from a side thereof, filling the cavity 14b with a composition containing the matrix resin and the magnetic filler; and molding the composition while the magnetic filler is radially aligned. With this configuration, the elastomer material is molded while the magnetic filler is radially aligned by using the permanent magnet.

14 Claims, 7 Drawing Sheets

(51) Int. Cl.
   *B29C 45/00* (2006.01)
   *B29C 45/17* (2006.01)
   *H01F 1/44* (2006.01)
   *B29K 21/00* (2006.01)
   *B29K 83/00* (2006.01)
   *B29K 505/12* (2006.01)

(52) U.S. Cl.
   CPC .............. *B29C 45/17* (2013.01); *B29C 70/62* (2013.01); *H01F 1/442* (2013.01); *B29K 2021/00* (2013.01); *B29K 2083/00* (2013.01); *B29K 2505/12* (2013.01); *B29K 2905/00* (2013.01); *B29K 2995/0008* (2013.01)

(56) References Cited

U.S. PATENT DOCUMENTS

| | | | | |
|---|---|---|---|---|
| 6,476,113 | B1* | 11/2002 | Hiles | B29C 45/0013 524/439 |
| 2005/0116194 | A1* | 6/2005 | Fuchs | F16F 1/3615 252/62.54 |
| 2006/0280921 | A1 | 12/2006 | Oh et al. | |
| 2008/0318045 | A1* | 12/2008 | Bose | H01F 1/375 428/402 |
| 2013/0093121 | A1* | 4/2013 | Honkura | H01F 1/01 264/429 |
| 2014/0272119 | A1* | 9/2014 | Kushalappa | B29C 70/62 264/429 |

FOREIGN PATENT DOCUMENTS

| | | |
|---|---|---|
| JP | 62-186508 | 8/1987 |
| JP | 7-086070 | 3/1995 |
| JP | 2005-226108 | 8/2005 |
| JP | 2007-035786 | 2/2007 |
| JP | 2016-086050 | 5/2016 |
| KR | 10-2017-0031831 | 3/2017 |
| WO | 2004/027795 | 4/2004 |

OTHER PUBLICATIONS

Espacenet machine translation of JP2016086050A (obtained Jul. 10, 2020).*

Search Report issued in corresponding United Kingdom Patent Application No. GB1810460.4, dated Dec. 18, 2018, 4 pages.

* cited by examiner

METHOD AND APPARATUS FOR PRODUCING RADIALLY ALIGNED MAGNETORHEOLOGICAL ELASTOMER MOLDED BODY

BACKGROUND OF THE INVENTION

1. Field of the Invention

The present invention relates to a method and an apparatus for producing a radially aligned magnetorheological elastomer molded body. More specifically, the present invention relates to a method and an apparatus for producing a radially aligned magnetorheological elastomer molded body by using a permanent magnet.

2. Description of Related Art

A fluid that changes its rheological properties when subjected to a magnetic field is called a magnetorheological fluid (MR fluid). The MR fluid is known as a non-colloidal suspension in which magnetically active particles (such as a fine magnetic powder) are uniformly dispersed. The MR fluid can be used for impact absorption, power transmission, attitude control, or the like. Moreover, the MR fluid has a wide range of applications, including: clutches, dampers, or shock absorbers for vehicles; vibration-damping support devices for various buildings; muscle parts of assembly robots; liquid flow control valves; various acoustic devices; and robot hands for medical, welfare, and caregiving purposes. Magnetorheological elastomer is considered as a type of the MR fluid. In some cases, magnetic particles in the magnetorheological elastomer should be radially aligned to produce a molded body. Patent Documents 1 to 3 propose a method for producing a magnetorheological elastomer molded body with radially aligned magnetic particles by using a plurality of magnetic field application means such as electromagnetic coils.

PRIOR ART DOCUMENTS

Patent Documents

Patent Document 1: JP 2016-086050
Patent Document 2: JP 2007-035786
Patent Document 3: JP 2005-226108

SUMMARY OF THE INVENTION

However, the conventional method using the electromagnetic coils requires wires for carrying electric current. This increases the size of the apparatus and raises the production cost. Moreover, press molding cannot be performed in a vacuum due to the presence of the wires.

In order to solve the above conventional problems, the present invention provides a method and an apparatus for producing a radially aligned magnetorheological elastomer molded body, in which an elastomer material is molded while a magnetic filler is aligned by using a permanent magnet. Thus, the method and the apparatus of the present invention can reduce the production cost and perform press molding in a vacuum.

A method for producing a radially aligned magnetorheological elastomer molded body containing a matrix resin and a magnetic filler of the present invention includes the following: placing a permanent magnet in at least one position selected from positions that are spaced from a metal mold having a cavity and located above and below the center of the metal mold; providing a closed magnetic circuit that allows a magnetic flux generated by the permanent magnet to pass through the metal mold from a side thereof; filling the cavity with a composition containing the matrix resin and the magnetic filler; and molding the composition while the magnetic filler is radially aligned.

An apparatus for producing a radially aligned magnetorheological elastomer molded body that is used in the method of the present invention includes the following: a metal mold having a cavity to be filled with a composition containing a matrix resin and a magnetic filler; a permanent magnet that is placed in at least one position selected from positions that are spaced from the metal mold and located above and below the center of the metal mold; and a closed magnetic circuit that allows a magnetic flux generated by the permanent magnet to pass through the metal mold from a side thereof.

In the present invention, the elastomer material is molded while the magnetic filler is aligned by using the permanent magnet. Thus, the method and the apparatus for producing a radially aligned magnetorheological elastomer molded body of the present invention can reduce the production cost and perform press molding in a vacuum. In other words, since the permanent magnet is used as a magnetic field generator instead of electromagnetic coils and wires, the production cost can be reduced, and press molding also can be performed in a vacuum.

DETAILED DESCRIPTION OF THE INVENTION

Figure 1:
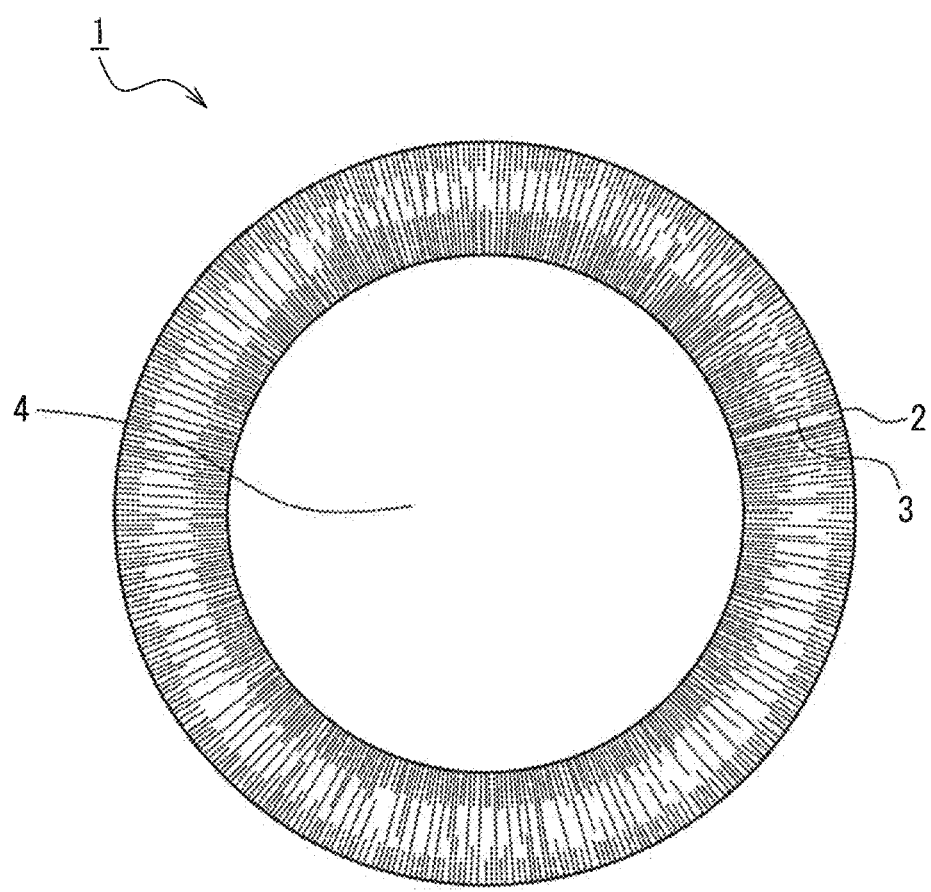
FIG. 1 is a schematic plan view of a molded body in an embodiment of the present invention.

The present invention relates to a method and an apparatus for producing a radially aligned magnetorheological elastomer molded body containing a matrix resin and a magnetic filler. The magnetic filler is radially aligned by the application of a magnetic field during molding, so that a molded body is formed with the magnetic filler being radially aligned. A permanent magnet is used as a magnetic field generator. The permanent magnet may be placed in one or both of the positions that are spaced from a metal mold having a cavity and located above and below the center of the metal mold. A closed magnetic circuit is provided that allows a magnetic flux generated by the permanent magnet to pass through the metal mold from a side thereof. The cavity is filled with a composition containing the matrix resin and the magnetic filler. The composition is molded while the magnetic filler is radially aligned. The cavity and the molded body may have any shape such as a ring, circle, rectangle, or polygon in a plan view.

In the present invention, it is preferable that a non-magnetic body is provided on at least a part of the upper surface and the lower surface of the metal mold, and a magnetic body is provided on the side surface of the metal mold. This configuration can form a better closed loop circuit of the magnetic flux generated by the permanent magnet. Moreover, a magnetic body may be provided on the lower surface of the permanent magnet and may be connected to the magnetic body on the side surface of the metal mold via a magnetic body. Further, a magnetic body or a non-magnetic body may be provided between the permanent magnet and the metal mold. With this configuration, the radial alignment of the magnetic filler can be achieved more efficiently.

The magnetic filler is preferably at least one selected from the group consisting of a magnetic wire, a magnetic powder, an inorganic powder with a magnetic film, a plate-like powder, and a filler that reacts to magnetism. The magnetic wire may be, e.g., a metal wire (with a diameter of 1 to 20 µm and a length of 0.1 to 5 mm). The magnetic powder may be, e.g., a carbonyl iron powder. The inorganic powder with a magnetic film may be obtained by forming a magnetic film on the surface of boron nitride (e.g., with an average particle diameter of 1 to 500 µm).

The magnetic powder may also be, e.g., a soft magnetic metal powder or an oxide magnetic powder (ferrite powder). Examples of the soft magnetic metal powder include a carbonyl iron powder and iron-based alloy powders of Fe—Si alloy, Fe—Al alloy, Fe—Si—Al alloy (Sendust), Fe—Si—Cr alloy, Fe—Ni alloy (Permalloy), Fe—Ni—Co alloy (Mumetal), Fe—Ni—Mo alloy (Supermalloy), Fe—Co alloy, Fe—Si—Al—Cr alloy, Fe—Si—B alloy, and Fe—Si—Co—B alloy. Examples of the ferrite powder include spinel ferrite powders of Mn—Zn ferrite, Mn—Mg—Zn ferrite, Mg—Cu—Zn ferrite, Ni—Zn ferrite, Ni—Cu—Zn ferrite, and Cu—Zn ferrite and hexagonal ferrite powders of W-type, Y-type, Z-type, and M-type. Among them, the carbonyl iron powder is preferred.

The carbonyl iron powder itself is well known as a type of a soft magnetic iron powder and as a powder product for industrial use. The carbonyl iron powder can be produced by thermal decomposition of carbonyl iron $(Fe(CO)_5)$, so that CO is removed from the carbonyl iron. The average particle size of the carbonyl iron powder is preferably 2 to 10 µm, and more preferably 2 to 8 µm. The particle size may be measured with a laser diffraction scattering method to determine a particle size at 50% (by mass). The method may use a laser diffraction particle size analyzer LA-950S2 manufactured by Horiba, Ltd.

The amount of the magnetic filler is preferably 1 to 70% by volume with respect to 100% by volume of the radially aligned magnetorheological elastomer molded body. By controlling the amount of the magnetic filler within this range, the magnetic filler will be radially aligned upon the application of a magnetic force.

The matrix resin may be either a thermosetting resin or a thermoplastic resin. The matrix resin may also include rubber and an elastomer. Examples of the rubber include (but are not limited to) the following: natural rubber (NR: ASTM abbreviation); isoprene rubber (IR); butadiene rubber (BR); 1,2-polybutadiene rubber (1,2-BR); styrene-butadiene rubber (SBR); chloroprene rubber (CR); nitrile rubber (NBR); butyl rubber (IIR); ethylene-propylene rubber (EPM, EPDM; chlorosulfonated polyethylene (CSM); acrylic rubber (ACM, ANM); epichlorohydrin rubber (CO, ECO); polysulfide rubber (T); silicone rubber; fluorocarbon rubber (FKM); and urethane rubber (U). These materials can also be applied to the thermoplastic elastomer (TPE). Examples of the thermoplastic elastomer (TPE) include (but are not limited to) the following: styrene based TPE; olefin based TPE; vinyl chloride based TPE; urethane based TPE; ester based TPE; amide based TPE; chlorinated polyethylene based TPE; syn-1,2-polybutadiene based TPE; trans-1, 4-polyisoprene based TPE; and fluorine based TPE. The crosslinking of silicone rubber may be either an addition reaction or a peroxide reaction. In the following description, the crosslinking is performed by the addition reaction.

The radially aligned magnetorheological elastomer molded body has an Asker C hardness of 5 to 60, which is based on the standards (SRIS0101) of the Society of Rubber Science and Technology Japan. Thus, the magnetorheological elastomer molded body can exhibit a large change in storage modulus in response to an applied magnetic force.

The matrix resin is preferably an organopolysiloxane. This is because the organopolysiloxane has high heat resistance and good processability. The composition including the organopolysiloxane as a matrix may be in any form of rubber, rubber sheet, putty, or grease.

Examples of the permanent magnet include a neodymium magnet, a ferrite magnet, a samarium-cobalt magnet, an alnico magnet, KS-steel, and MK steel. Among them, the neodymium magnet is preferred. Since the magnetic force of the neodymium magnet is large, the size of the molding apparatus can be reduced. The neodymium magnet is preferably plated with Ni to improve the anti-corrosion properties.

It is preferable that a movement member for moving the metal mold away from and/or closer to the permanent magnet is provided so that the metal mold is moved away from the permanent magnet to a position where it is not affected by the magnetic force of the permanent magnet when a molding material is injected into the cavity of the metal mold, and the metal mold is moved closer to the permanent magnet when the molding material is molded. With this configuration, the molding material can be injected without the influence of a magnetic field. In this context, the molding indicates a process in which a resin is cured in the cavity to form a molded body having a predetermined shape when the resin is a thermosetting resin. Moreover, the molding indicates a process in which a molten resin is cooled and solidified in the cavity to form a molded body having a predetermined shape when the resin is a thermoplastic resin.

The apparatus of the present invention includes a permanent magnet as a magnetic field generator and a metal mold having a cavity. The permanent magnet is placed in at least one position that is below the center of the metal mold. Non-magnetic bodies are provided on the upper surface and the lower surface of the metal mold, respectively. In order to make a loop of magnetic flux generated from the permanent magnet, a lower magnetic body is provided on the lower surface of the permanent magnet, and side magnetic bodies are provided on the side and edge of the metal mold and the non-magnetic body located under the metal mold. The apparatus preferably includes a movement member for moving the metal mold so that the metal mold is moved away from the permanent magnet to a position where it is not affected by the magnetic force of the permanent magnet when a molding material is injected into the cavity of the metal mold, and the metal mold is moved closer to the permanent magnet when the molding material is molded.

When the organopolysiloxane is used as a matrix resin, a compound with the following composition may be obtained by curing.

(A) Base polymer component: a linear organopolysiloxane having an average of two or more alkenyl groups per molecule, in which the alkenyl groups are bonded to silicon atoms at both ends of the molecular chain.

(B) Crosslinking component: an organohydrogenpolysiloxane having an average of two or more hydrogen atoms bonded to silicon atoms per molecule, in which the amount of the organohydrogenpolysiloxane is less than 1 mol with respect to 1 mol of the alkenyl groups bonded to the silicon atoms in the component (A).

(C) Platinum-based metal catalyst: the amount of the catalyst is 0.01 to 1000 ppm in weight with respect to the component (A).

(D) Magnetic filler: the amount of the magnetic filler is 1 to 70% by volume with respect to 100% by volume of the composition.

(E) Inorganic pigment: the amount of the inorganic pigment is 0.1 to 10 parts by weight with respect to 100 parts by weight of the matrix resin.

(1) Base Polymer Component (Component (A))

The base polymer component (component (A)) is an organopolysiloxane having two or more alkenyl groups bonded to silicon atoms per molecule. The organopolysiloxane containing two alkenyl groups is the base resin (base polymer component) of the silicone rubber composition of the present invention. In the organopolysiloxane, two alkenyl groups having 2 to 8 carbon atoms, and preferably 2 to 6 carbon atoms such as vinyl groups or allyl groups are bonded to the silicon atoms per molecule. The viscosity of the organopolysiloxane is preferably 10 to 1000000 mPa·s, and more preferably 100 to 100000 mPa·s at 25° C. in terms of workability and curability.

Specifically, an organopolysiloxane expressed by the following general formula (chemical formula 1) is used. The organopolysiloxane has an average of two or more alkenyl groups per molecule, in which the alkenyl groups are bonded to silicon atoms at both ends of the molecular chain. The organopolysiloxane is a linear organopolysiloxane whose side chains are blocked with triorganosiloxy groups. The viscosity of the linear organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 1]

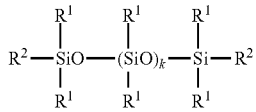

In this formula, $R^1$ represents substituted or unsubstituted monovalent hydrocarbon groups that are the same as or different from each other and have no aliphatic unsaturated bond, $R^2$ represents alkenyl or cycloalkenyl groups, and k represents 0 or a positive integer. The monovalent hydrocarbon groups represented by $R^1$ preferably have 1 to 10 carbon atoms, and more preferably 1 to 6 carbon atoms. Specific examples of the monovalent hydrocarbon groups include the following: alkyl or cycloalkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups: aralkyl groups such as benzyl, phenylethyl, and phenylpropyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups. The alkenyl or cycloalkenyl groups represented by $R^2$ preferably have 2 to 6 carbon atoms, and more preferably 2 to 3 carbon atoms. Specific examples of the alkenyl or cycloalkenyl groups include vinyl, allyl, propenyl, isopropenyl, butenyl, isobutenyl, hexenyl, and cyclohexenyl groups. In particular, the vinyl group is preferred. In the general formula (1), k is typically 0 or a positive integer satisfying $0 \leq k \leq 10000$, preferably $5 \leq k \leq 2000$, and more preferably $10 \leq k \leq 1200$.

The component (A) may also include an organopolysiloxane having three or more, typically 3 to 30, and preferably about 3 to 20, alkenyl groups bonded to silicon atoms per molecule. The alkenyl groups have 2 to 8 carbon atoms, and preferably 2 to 6 carbon atoms and can be, e.g., vinyl groups or allyl groups. The molecular structure may be a linear, ring, branched, or three-dimensional network structure. The organopolysiloxane is preferably a linear organopolysiloxane in which the main chain is composed of repeating diorganosiloxane units, and both ends of the molecular chain are blocked with triorganosiloxy groups. The viscosity of the linear organopolysiloxane is preferably 10 to 1000000 mPa·s, and more preferably 100 to 100000 mPa·s at 25° C.

Each of the alkenyl groups may be bonded to any part of the molecule. For example, the alkenyl group may be bonded to either a silicon atom that is at the end of the molecular chain or a silicon atom that is not at the end (but in the middle) of the molecular chain. In particular, a linear organopolysiloxane expressed by the following general formula (chemical formula 2) is preferred. The linear organopolysiloxane has 1 to 3 alkenyl groups on each of the silicon atoms at both ends of the molecular chain. In this case, however, if the total number of the alkenyl groups bonded to the silicon atoms at both ends of the molecular chain is less than 3, at least one alkenyl group is bonded to the silicon atom that is not at the end of (but in the middle of) the molecular chain (e.g., as a substituent in the cliorganosiloxane unit). As described above, the viscosity of the linear organopolysiloxane is preferably 10 to 1000000 mPa·s at 25° C. in terms of workability and curability. Moreover, the linear organopolysiloxane may include a small amount of branched structure (trifunctional siloxane units) in the molecular chain.

[Chemical Formula 2]

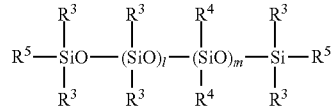

In this formula, $R^3$ represents substituted or unsubstituted monovalent hydrocarbon groups that are the same as or different from each other, and at least one of them is an alkenyl group, $R^4$ represents substituted or unsubstituted monovalent hydrocarbon groups that are the same as or different from each other and have no aliphatic unsaturated bond, $R^5$ represents alkenyl groups, and l and m represent 0 or a positive integer. The monovalent hydrocarbon groups represented by $R^3$ preferably have 1 to 10 carbon atoms, and more preferably 1 to 6 carbon atoms. Specific examples of the monovalent hydrocarbon groups include the following: alkyl groups such as methyl, ethyl, propyl, isopropyl, butyl, isobutyl, tert-butyl, pentyl, neopentyl, hexyl, cyclohexyl, octyl, nonyl, and decyl groups; aryl groups such as phenyl, tolyl, xylyl, and naphthyl groups; aralkyl groups such as benzyl, phenylethyl, and phenylpropyl groups; alkenyl groups such as vinyl, allyl, propenyl, isopropenyl, butenyl, hexenyl, cyclohexenyl, and octenyl groups; and substituted forms of these groups in which some or all hydrogen atoms are substituted by halogen atoms (fluorine, bromine, chlorine, etc.) or cyano groups, including halogen-substituted alkyl groups such as chloromethyl, chloropropyl, bromoethyl, and trifluoropropyl groups and cyanoethyl groups.

The monovalent hydrocarbon groups represented by $R^4$ also preferably have 1 to 10 carbon atoms, and more preferably 1 to 6 carbon atoms. The monovalent hydrocarbon groups may be the same as the specific examples of $R^1$, but do not include an alkenyl group. The alkenyl groups represented by $R^5$ preferably have 2 to 6 carbon atoms, and more preferably 2 to 3 carbon atoms. Specific examples of the alkenyl groups are the same as those of $R^2$ in the above formula (chemical formula 1), and the vinyl group is preferred.

In the general formula (chemical formula 2), l and m are typically 0 or positive integers satisfying $0<l+m\leq10000$, preferably $5\leq l+m\leq2000$, and more preferably $10\leq l+m\leq1200$. Moreover, l and m are integers satisfying $0<l/(l+m)\leq0.2$, and preferably $0.0011\leq l/(l+m)\leq0.1$.

(2) Crosslinking Component (Component (B))

The component (B) is an organohydrogenpolysiloxane that acts as a crosslinking agent. The addition reaction (hydrosilylation) between SiH groups in the component (B) and alkenyl groups in the component (A) produces a cured product. Any organohydrogenpolysiloxane that has two or more hydrogen atoms (i.e., SiH groups) bonded to silicon atoms per molecule may be used. The molecular structure of the organohydrogenpolysiloxane may be a linear, ring, branched, or three-dimensional network structure. The number of silicon atoms in a molecule (i.e., the degree of polymerization) may be 2 to 1000, and preferably about 2 to 300.

The locations of the silicon atoms to which the hydrogen atoms are bonded are not particularly limited. The silicon atoms may be either at the ends or not at the ends (but in the middle) of the molecular chain. The organic groups bonded to the silicon atoms other than the hydrogen atoms may be, e.g., substituted or unsubstituted monovalent hydrocarbon groups that have no aliphatic unsaturated bond, which are the same as those of $R^1$ in the above general formula (chemical formula 1).

The following structures can be given as examples of the organohydrogenpolysiloxane of the component (B).

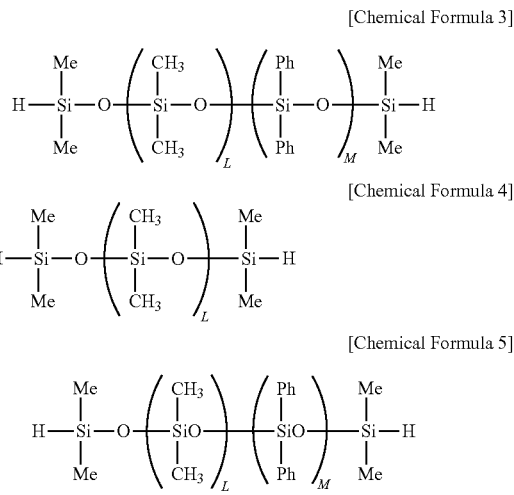

In these formulas, Ph represents organic groups including at least one of phenyl, epoxy, acryloyl, methacryloyl, and alkoxy groups, L is an integer of 0 to 1000, and preferably 0 to 300, and M is an integer of 1 to 200.

(3) Catalyst Component (Component (C))

The component (C) is a catalyst component that accelerates the curing of the composition of the present invention. The component (C) may be a known catalyst used for a hydrosilylation reaction. Examples of the catalyst include platinum group metal catalysts such as platinum-based, palladium-based, and rhodium-based catalysts. The platinum-based catalysts include, e.g., platinum black, platinum chloride, chloroplatinic acid, a reaction product of chloroplatinic acid and monohydric alcohol, a complex of chloroplatinic acid and olefin or vinylsiloxane, and platinum bisacetoacetate. The component (C) may be mixed in an amount that is required for curing, and the amount can be appropriately adjusted in accordance with the desired curing rate or the like. The component (C) is added at 0.01 to 1000 ppm based on the weight of metal atoms to the component (A).

(4) Magnetic Powder (Component (D))

It is preferable that the magnetic powder is surface treated with alkoxysilane or alkyl titanate. The surface treatment can prevent curing inhibition when silicone rubber is used. The alkoxysilane is preferably a silane compound or its partial hydrolysate. The silane compound is expressed by $R(CH_3)_aSi(OR')_{3-a}$, where R represents an alkyl group having 1 to 20 carbon atoms, R' represents an alkyl group having 1 to 4 carbon atoms, and a is 0 or 1. Examples of an alkoxysilane compound (simply referred to as "silane" in the following) expressed by $R(CH_3)_aSi(OR')_{3-a}$, where R represents an alkyl group having 1 to 20 carbon atoms, R' represents an alkyl group having 1 to 4 carbon atoms, and a is 0 or 1, include the following: methyltrimethoxysilane; ethyltrimethoxysilane; propyltrimethoxysilane; butyltrimethoxysilane; pentyltrimethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane; dodecyltriethoxysilane; hexadecyltrimethoxysilane; hexadecyltriethoxysilane; octadecyltrimethoxysilane; and octadecyltriethoxysilane. These silane compounds may be used individually or in combinations of two or more. The alkoxysilane and one-end silanol siloxane may be used together as a surface treatment agent. In this case, the surface treatment may include adsorption in addition to a covalent bond.

(5) Other Components (Component (E))

The composition of the present invention may include components other than the above as needed. For example, the composition may include an inorganic pigment such as colcothar, and alkyltrialkoxysilane used, e.g., for the surface treatment of a filler. Moreover, alkoxy group-containing silicone may be added, e.g., for the surface treatment of a filler.

Hereinafter, the present invention will be described with reference to the drawings. In the following drawings, the same components are denoted by the same reference numerals. FIG. 1 is a schematic plan view of a molded body in an embodiment of the present invention. The molded body is a radially aligned magnetorheological elastomer molded body 1 containing a matrix resin 2 and a magnetic filler 3. The magnetic filler 3 is radially aligned. The radially aligned magnetorheological elastomer molded body 1 has a ring shape as a whole, leaving a space 4 in the center.

Figure 2:
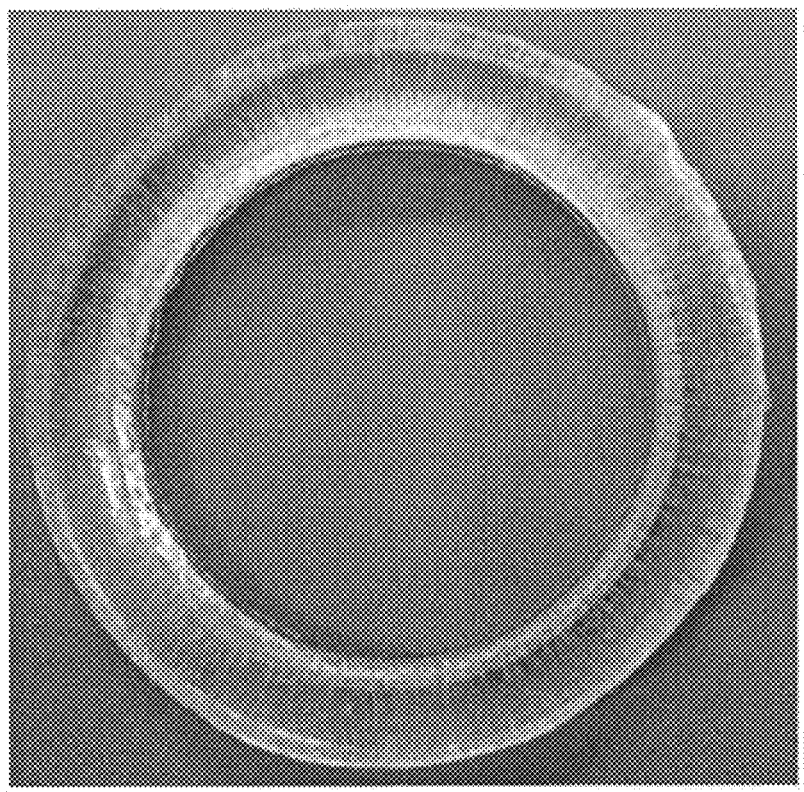
FIG. 2 is a plan view photograph of the molded body (with an outer diameter of 40 mm, an inner diameter of 30 mm, and a thickness of 5 mm).

FIG. 2 is a plan view photograph of the molded body (with an outer diameter of 40 mm, an inner diameter of 30 mm, and a thickness of 5 mm). In FIG. 2, a transparent matrix resin is used to show the radial alignment of the magnetic filler.

Figure 3:
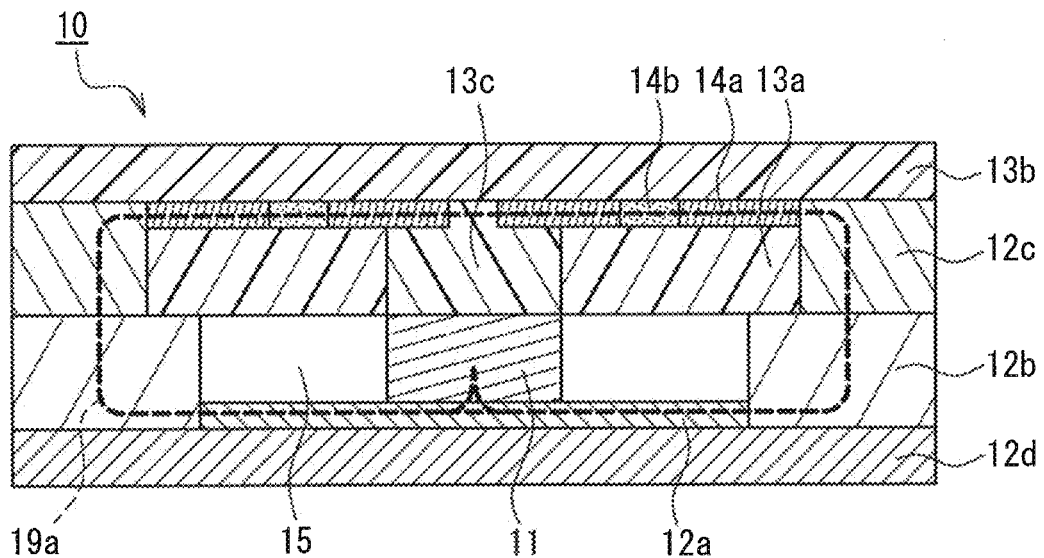
FIG. 3 is a schematic cross-sectional view of a molding apparatus in an embodiment of the present invention.

FIG. 3 is a schematic cross-sectional view of a molding apparatus 10 in an embodiment of the present invention. As illustrated in FIG. 3, the molding apparatus 10 includes a permanent magnet 11 as a magnetic field generator and a metal mold 14a having a ring-shaped cavity 14b. The permanent magnet 11 is placed in at least one position that is below the center of the metal mold 14a. Non-magnetic bodies 13a, 13b are provided on the lower surface and the upper surface of the metal mold 14a, respectively. In order to make a loop of magnetic flux 19a generated from the permanent magnet 11, a lower magnetic body 12a is provided on the lower surface of the permanent magnet 11, and side magnetic bodies 12c, 12b are provided on the side and edge of the metal mold 14a and the non-magnetic body 13a located under the metal mold 14a. A space 15 is provided around the permanent magnet 11. A base magnetic body 12d is provided under the lower magnetic body 12a and the side magnetic body 12b. The magnetic field is off in the base magnetic body 12d. The magnetic flux 19a flows in a loop and causes the magnetic filler to be oriented horizontally in the cavity 14b. In this state, the matrix resin is cured and molded. As an example, the following materials may be used: neodymium for the permanent magnet; iron and steel for the lower and side magnetic bodies; aluminum alloy for the non-magnetic bodies; iron and steel for the metal mold; and stainless steel wire for the magnetic filler.

Figure 4:
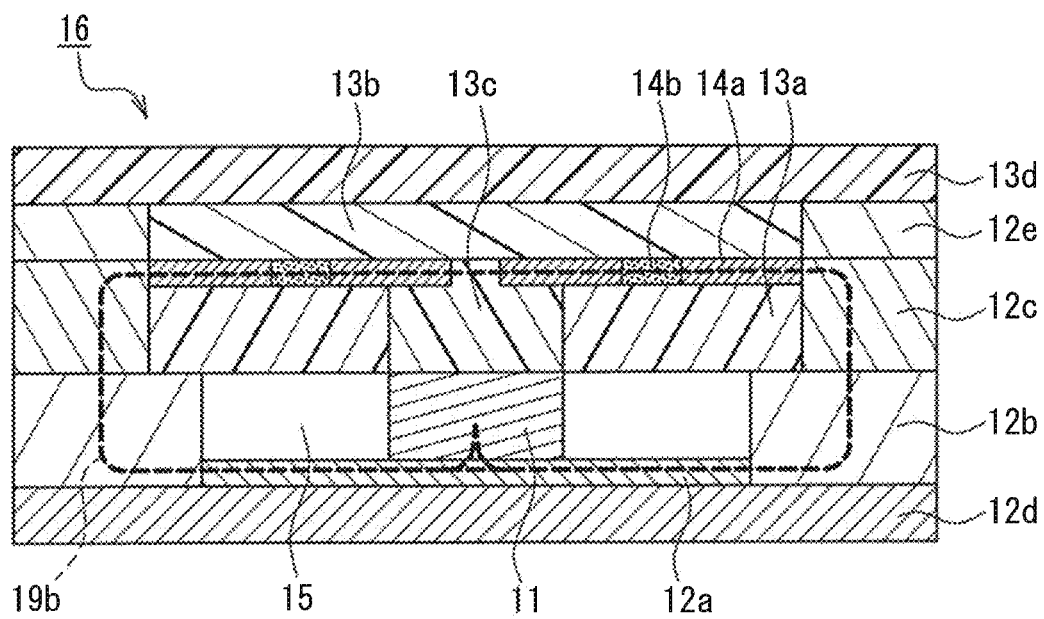
FIG. 4 is a schematic cross-sectional view of a molding apparatus in another embodiment of the present invention.

FIG. 4 is a schematic cross-sectional view of a molding apparatus 16 in another embodiment of the present invention. As illustrated in FIG. 4, the molding apparatus 16 differs from the molding apparatus 10 in FIG. 3 in that a non-magnetic body 13b with the same outer diameter as the metal mold 14a is provided on the upper surface of the metal mold 14a, that a side magnetic body 12e is provided on the side surface of the non-magnetic body 13b, and that a non-magnetic body 13d is provided on the upper surfaces of the non-magnetic body 13b and the side magnetic body 12e. A magnetic flux 19b flows in a loop, as described above.

Figure 5:
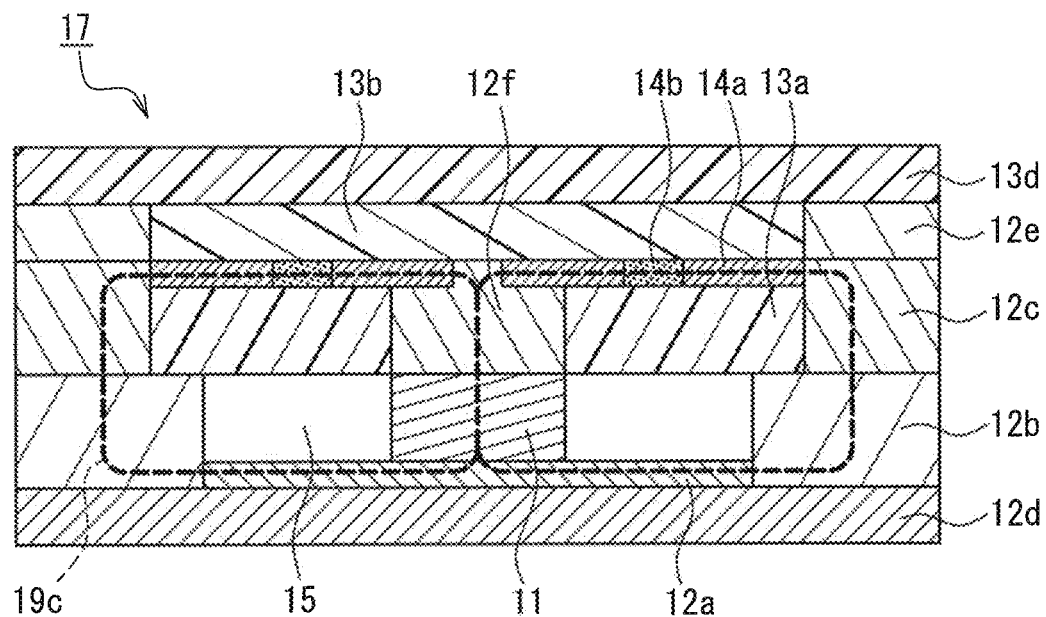
FIG. 5 is a schematic cross-sectional view of a molding apparatus in yet another embodiment of the present invention.

FIG. 5 is a schematic cross-sectional view of a molding apparatus 17 in yet another embodiment of the present invention. As illustrated in FIG. 5, the molding apparatus 17 differs from the molding apparatus 16 in FIG. 4 in that a magnetic body 12f is provided on the upper surface of the permanent magnet 11. A magnetic flux 19c flows in a loop, as descried above.

Figure 6:
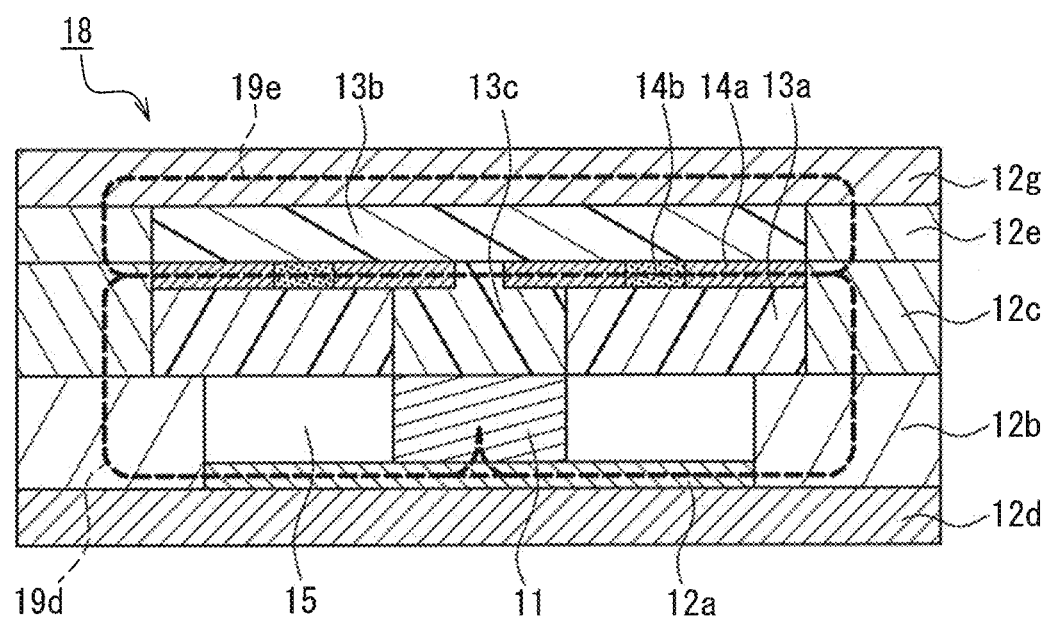
FIG. 6 is a schematic cross-sectional view of a molding apparatus in still another embodiment of the present invention.

FIG. 6 is a schematic cross-sectional view of a molding apparatus 18 in still another embodiment of the present invention. As illustrated in FIG. 6, the molding apparatus 18 differs from the molding apparatus 16 in FIG. 4 in that the non-magnetic body 13d is replaced by a magnetic body 12g. A magnetic flux 19d and a magnetic flux 19e flow in a loop, as described above.

Figure 7A:
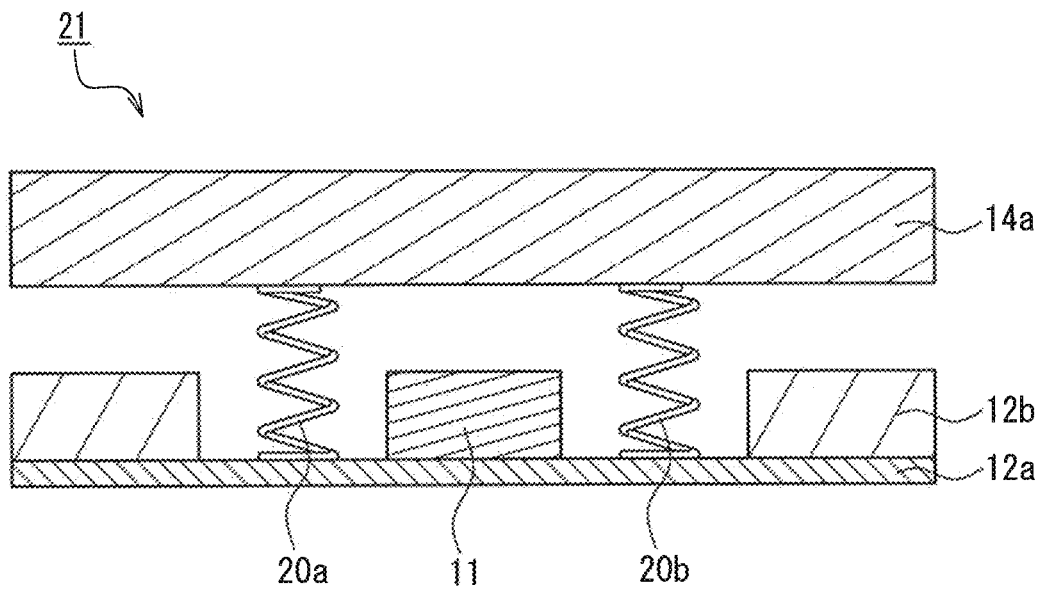
FIG. 7A is a schematic cross-sectional view of a molding apparatus in an embodiment of the present invention, in which a mold is separated from a magnet.
Figure 7B:
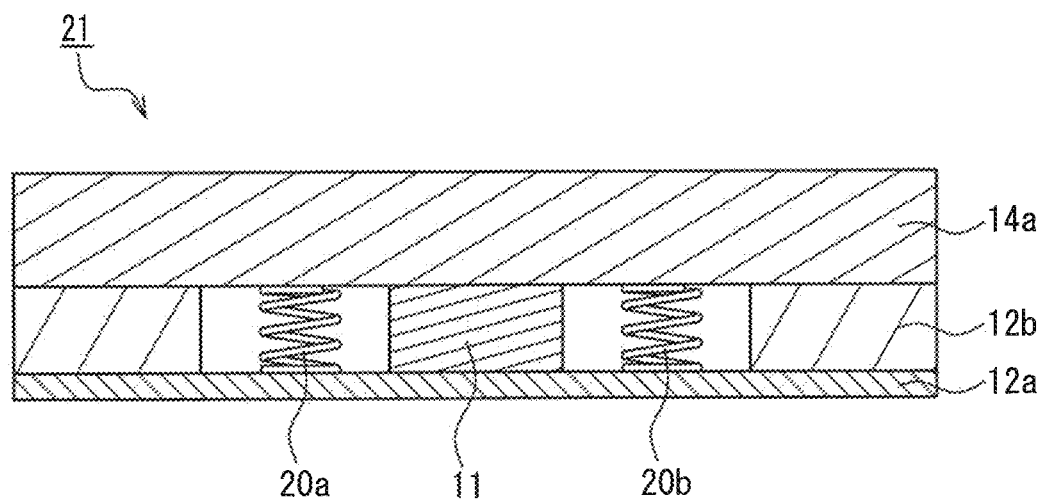
FIG. 7B is a schematic cross-sectional view of the molding apparatus in which the mold is connected to the magnet.

FIG. 7A is a schematic cross-sectional view of a molding apparatus 21 in an embodiment of the present invention, in which the metal mold 14a is separated from the permanent magnet 11. FIG. 7B is a schematic cross-sectional view of the molding apparatus 21 in which the metal mold 14a is connected to the permanent magnet 11. When a molding material is injected into the cavity 14b of the metal mold 14a, the metal mold 14a is moved away from the permanent magnet 11 to a position where it is not affected by the magnetic force of the permanent magnet 11. When the molding material is molded, the metal mold 14a is moved closer to the permanent magnet 11. Any known systems such as a spring, jack, and screw may be used as movement members 20a, 20b for moving the metal mold 14a. In this embodiment, the movement members 20a, 20b are springs.

Figure 8:
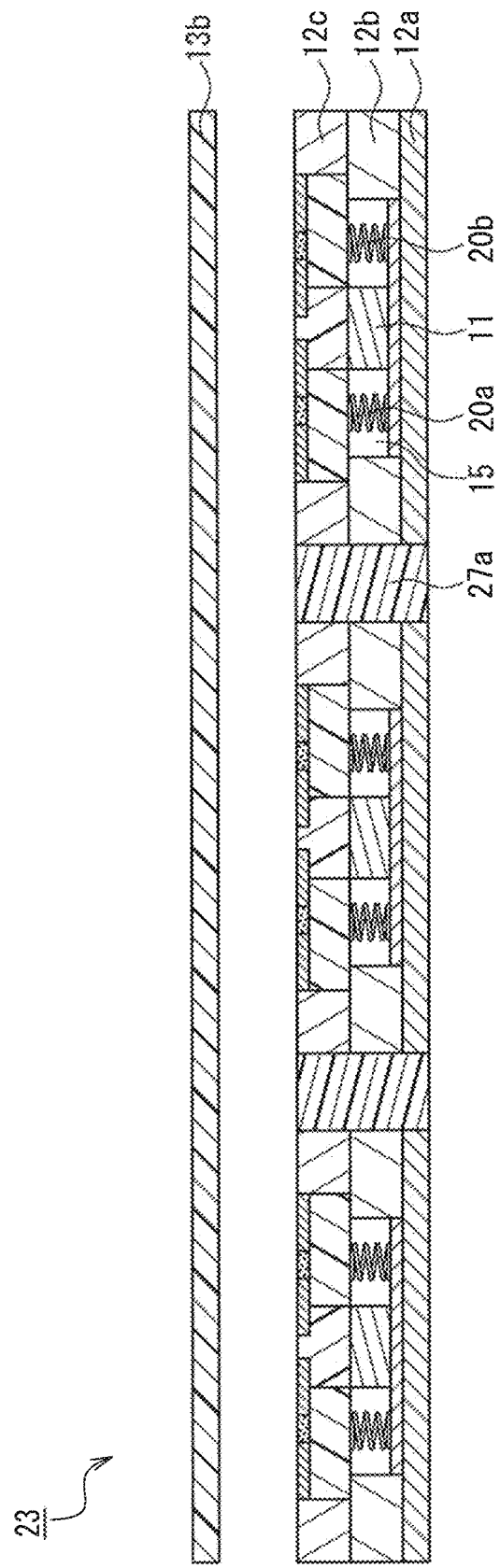
FIG. 8 is a schematic cross-sectional view of a molding apparatus for forming multiple molded bodies in an embodiment of the present invention.

FIG. 8 is a schematic cross-sectional view of a molding apparatus 23 for forming multiple molded bodies in an embodiment of the present invention. As an example, three molding apparatuses, as illustrated in FIG. 3, are arranged in a row, and a non-magnetic body 27a is interposed between each of the molding apparatuses. With this configuration, three molded bodies are formed simultaneously.

Figure 9A:
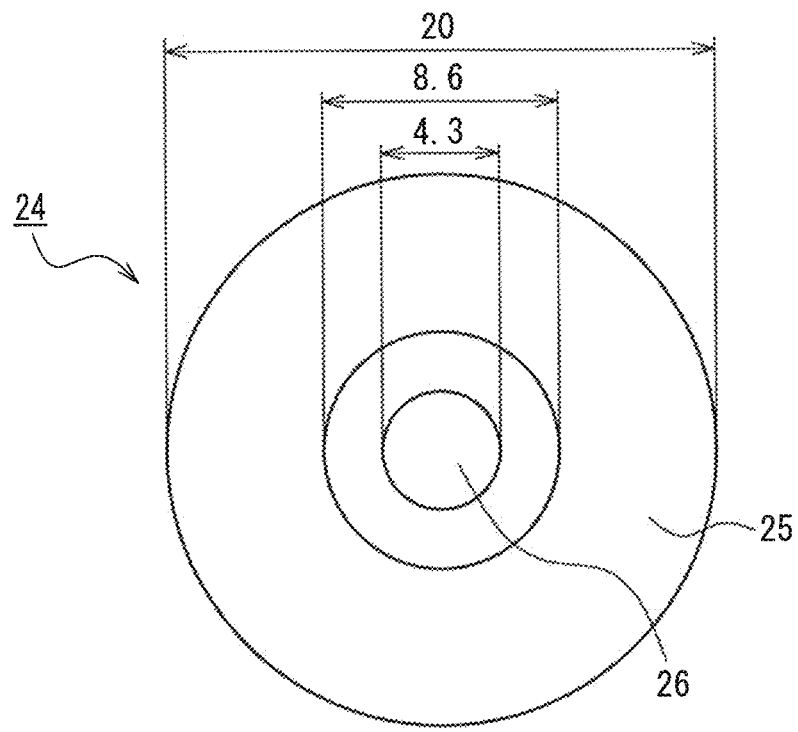
FIG. 9A is a plan view of a neodymium magnet used in an embodiment of the present invention.
Figure 9B:
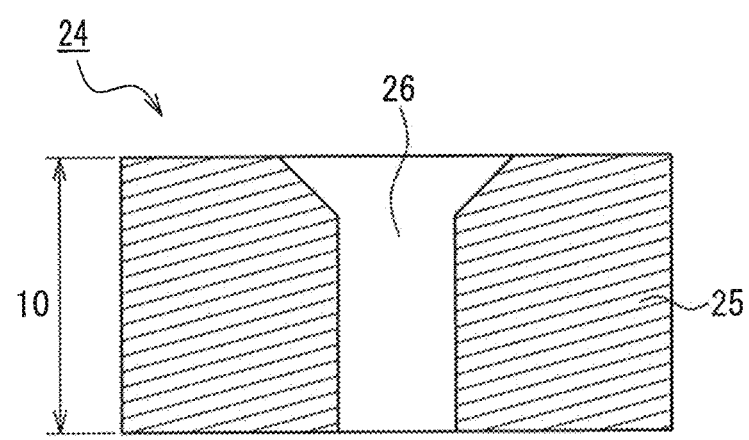
FIG. 9B is a cross-sectional view of the neodymium magnet.

FIG. 9A is a plan view of a neodymium magnet 24 used in an embodiment of the present invention. FIG. 9B is a cross-sectional view of the neodymium magnet 24. The neodymium magnet 24 is composed of a cylindrical magnet body 25 with a space 26 inside. The space 26 becomes gradually larger at the upper end of the magnet body 25.

The radially aligned magnetorheological elastomer molded body of the present invention can be incorporated into a vibrating portion, and thus can be applied to a vibration absorbing device that absorbs vibrations of the vibrating portion by utilizing a change in storage modulus of the magnetorheological elastomer molded body in response to an applied magnetic force. It is preferable that the vibrating portion is used in at least one selected from the following: impact absorbers; power transmitters; attitude controllers; clutches for vehicles; dampers for vehicles; shock absorbers for vehicles; vibration-damping support devices for buildings; muscle parts of assembly robots; liquid flow control valves; acoustic devices; and robot hands for medical, welfare, and caregiving purposes.

EXAMPLES

Hereinafter, the present invention will be described by way of examples. However, the present invention is not limited to the following examples.

<Hardness>

The Asker C hardness was measured according to the standards (SRIS0101) of the Society of Rubber Science and Technology, Japan.

Example 1

1. Material Component
  (1) Silicone Component
  Two-part, room temperature curing silicone rubber was used as a silicone component. The two-part RTV (room temperature vulcanizing) silicone rubber had previously been mixed with the base polymer component (component (A)), the crosslinking component (component (B)), and the platinum-based metal catalyst (component (C)).
  (2) Magnetic Filler
  A stainless steel wire (with a diameter of 12 μm and a length of 1 mm) was used as a magnetic filler, and 5 parts by weight of the magnetic filler was added to 100 parts by weight of the silicone component.
  (3) Permanent Magnet
  A neodymium magnet (trade name: "Neodymium" manufactured by Magfine Corporation) having a shape as illustrated in FIG. 9 was used as a permanent magnet. Table 1 shows the specification of the neodymium magnet. In Table 1, the surface treatment indicates Ni plating.

TABLE 1

Product name
Neodymium Φ20 mm × Φ4.3 mm × 10 mm/M4

| Item | Name | Symbol | SI | | CGS | |
|---|---|---|---|---|---|---|
| Shape | Diameter | D | 20 | mm | 2 | cm |
| | Internal diameter | ID | 4.3 | mm | 0.43 | cm |
| | Internal diameter at the end | S | 8.6 | mm | 0.86 | cm |
| | Height | H | 10 | mm | 1 | cm |
| | Screw | M | 4 | mm | 0.4 | cm |
| | Dimensional tolerance | D | 0.1 | mm | 0.01 | cm |
| | +/− | ID | 0.1 | mm | 0.01 | cm |
| | | H | 0.1 | mm | 0.01 | cm |
| | Direction of magnetization | M | axial direction | | | |
| | Weight | Net | 0.0224 | kg | 22.4 | g |
| | Surface treatment | Ni | 12 | μm | | |
| Magnetic characteristics | Surface magnetic flux density | B | 419.9 | mT | 4199 | G |
| | Attractive force | F | 8.23 | kgf | 8231 | gf |
| | Magnetic flux density on load point | Bd | 753.8 | mT | 7538 | G |
| | Total flux | Φo | 0.00022588 | Wb | 22588 | Mx |
| | Permeance coefficient | Pc | 1.8 | Pc | | |
| | Upper operating temperature limit | Tw | 90° | C. | | |
| | Lower operating temperature limit | Tw | —° | C. | | |
| Material characteristics | Material grade | Neodymium | 35 | | | |
| | Residual flux density | Br | 1170-1220 | mT | 11.7-12.2 | kG |
| | Coercive force | Hcb | ≥868 | kA/m | ≥10.9 | kOe |
| | Intrinsic coercive force | Hcj | ≥955 | kA/m | ≥12 | kOe |
| | Maximum energy product | BH | 263-287 | kj/m$^3$ | 33-36 | MGOe |
| | Temperature coefficient | Br | −0.12%/° | C. | | |
| | | Hcj | −0.55%/° | C. | | |
| | Heat resistant temperature | Tw | ≤80° | C. | | |
| | Curie temperature | Tc | 310° | C. | | |
| | Density | ρ | 7.5 | kg/m$^3$ | | |

(Note: SI represents the International System of Units and CGS represents the CGS System of Units.)

(4) Molding Method
Using the molding apparatus as illustrated in FIGS. 3 and 7A to 7B, the molding process was performed at 50° C. for 10 minutes, thereby providing a radially aligned magnetorheological elastomer molded body as shown in FIG. 2. The radially aligned magnetorheological elastomer molded body had an outer diameter of 40 mm, an inner diameter of 30 mm, and a thickness of 5 mm.

Example 2

The molding process was performed in the same manner as Example 1, except that a carbonyl iron powder with an average particle size of 3.9 to 5.0 μm was used as a magnetic filler, and the magnetic filler was added in an amount of 50% by volume and then mixed uniformly. As a result, like the molded body shown in FIG. 2, a magnetorheological elastomer molded body in which the carbonyl iron powder was radially aligned was obtained. The radially aligned magnetorheological elastomer molded body had an outer diameter of 40 mm, an inner diameter of 30 mm, and a thickness of 5 mm.

INDUSTRIAL APPLICABILITY

The radially aligned magnetorheological elastomer molded body of the present invention can be incorporated into a vibrating portion, and thus can be applied to a vibration absorbing device that absorbs vibrations of the vibrating portion by utilizing a change in storage modulus of the magnetorheological elastomer molded body in response to an applied magnetic force.

DESCRIPTION OF REFERENCE NUMERALS

| | |
|---|---|
| 1 | Molded body |
| 2 | Matrix resin |
| 3 | Magnetic filler |
| 4, 15, 26 | Space |
| 10, 16-18, 21, 23 | Molding apparatus |
| 11 | Permanent magnet |
| 12a-12g | Magnetic body |
| 13a-13d, 27a | Non-magnetic body |
| 14a | Metal mold |
| 14b | Ring-shaped cavity |
| 19a-19e | Magnetic flux |
| 20a, 20b | Movement member |
| 24 | Neodymium magnet |
| 25 | Cylindrical magnet body |

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a radially aligned magnetorheological elastomer molded body containing a matrix resin and a magnetic filler,
the method comprising:
   placing a single permanent magnet in one position for one molded body, the one position being spaced from a metal mold that has a cavity, the one position being located above or below a center of the metal mold;
   providing a closed magnetic circuit that allows a magnetic flux generated by the single permanent magnet to pass through the metal mold from a side thereof;
   filling the cavity with a composition containing the matrix resin and the magnetic filler;
   molding the composition while the magnetic filler is radially aligned in straight lines extending outwards from a center, thereby forming a ring shape as a whole with a space in the center; and
   curing the composition.

2. The method according to claim 1, wherein a non-magnetic body is provided on at least a part of an upper surface and a lower surface of the metal mold, and a side magnetic body is provided on a side surface of the metal mold.

3. The method according to claim 2, wherein a lower magnetic body is provided on a lower surface of the permanent magnet and is connected to the side magnetic body on the side surface of the metal mold via a connecting magnetic body.

4. The method according to claim 1, wherein a magnetic body or a non-magnetic body is provided between the permanent magnet and the metal mold.

5. The method according to claim 1, wherein the magnetic filler is at least one selected from the group consisting of a magnetic wire, a magnetic powder, an inorganic powder with a magnetic film, a plate-like powder, and a filler that reacts to magnetism.

6. The method according to claim 5, wherein the magnetic wire is a metal wire.

7. The method according to claim 5, wherein the magnetic powder is at least one selected from the group consisting of a carbonyl iron powder and iron-based alloy powders of Fe—Si alloy, Fe—Al alloy, Fe—Si—Al alloy (Sendust), Fe—Si—Cr alloy, Fe—Ni alloy (Permalloy), Fe—Ni—Co alloy (Mumetal), Fe—Ni—Mo alloy (Supermalloy), Fe—Co alloy, Fe—Si—Al—Cr alloy, Fe—Si—B alloy, and Fe—Si—Co—B alloy.

8. The method according to claim 1, wherein an amount of the magnetic filler is 1 to 70% by volume with respect to 100% by volume of the radially aligned magnetorheological elastomer molded body.

9. The method according to claim 1, wherein the matrix resin is an organopolysiloxane.

10. The method according to claim 1, wherein the permanent magnet is made of a hard magnetic material selected from the group consisting of neodymium, ferrite, and samarium cobalt.

11. The method according to claim 1, wherein a movement means is provided to move the metal mold into the closed magnetic circuit and to move the metal mold from the closed magnetic circuit to a position where the metal mold is not affected by a magnetic force of the permanent magnet.

12. The method according to claim 1, wherein the composition filled into the cavity comprises:
   (A) a base polymer component that is a linear organopolysiloxane having an average of two or more alkenyl groups per molecule, in which the alkenyl groups are bonded to silicon atoms at both ends of a molecular chain;
   (B) a crosslinking component that is an organohydrogenpolysiloxane having an average of two or more hydrogen atoms bonded to silicon atoms per molecule, in which an amount of the organohydrogenpolysiloxane is less than 1 mol with respect to 1 mol. of the alkenyl groups bonded to the silicon atoms in the base polymer (A);
   (C) a platinum-based metal catalyst at a concentration of 0.01 to 1000 ppm in weight with respect to the base polymer (A); and
   (D) a magnetic filler in an amount of 1 to 70% by volume with respect to 100% by volume of the composition; and
the molding of the composition comprises curing the base polymer (A) and the crosslinking component (B) with an addition reaction.

13. The method according to claim 12, wherein the magnetic filler is surface treated with alkoxysilane or alkyl titanate.

14. The method according to claim 1, wherein the permanent magnet is cylindrical in shape.

* * * * *